Figure 1:
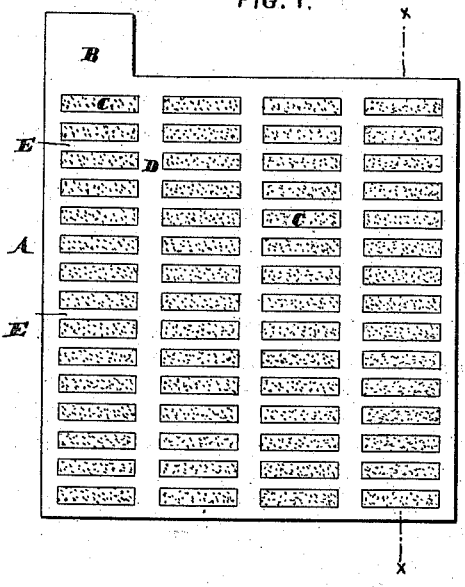

(No Model.)

R. M. HUNTER.

MANUFACTURE OF SECONDARY BATTERIES.

No. 383,575. Patented May 29, 1888.

Attest:
Henry Drury.
E. M. Breckinridge.

Inventor:

United States Patent Office.

RUDOLPH M. HUNTER, OF PHILADELPHIA, PENNSYLVANIA, ASSIGNOR TO THE ELECTRIC CAR COMPANY OF AMERICA, OF PENNSYLVANIA.

MANUFACTURE OF SECONDARY BATTERIES.

SPECIFICATION forming part of Letters Patent No. 383,575, dated May 29, 1888.

Application filed January 27, 1888. Serial No. 262,131. (No model.)

*To all whom it may concern:*

Be it known that I, RUDOLPH M. HUNTER, of the city and county of Philadelphia, and State of Pennsylvania, have invented an Improvement in the Manufacture of Secondary Batteries, of which the following is a specification.

My invention has reference to the manufacture of secondary batteries; and it consists of certain improvements, which are fully set forth in the following specification, and shown in the accompanying drawings, which form part thereof.

My invention particularly refers to the method of making secondary-battery plates or elements in a cheap manner, considering the subject from a commercial standpoint.

Heretofore it has been proposed to make commercial secondary-battery elements by two typical methods, viz: to first cast a lead grid or plate with undercut openings, and then to fill such openings with plastic oxide of lead or active material, and the other method was to form the oxide of lead in hard pieces or small cylinders, and while holding them tightly in a mold to cast the lead around them. It is to the last form of electrode or element that my invention has especial reference. It has also been proposed to make a battery of a series of conical electrodes or plates arranged horizontally, and in which the plates are made of lead, which, after being bored with a series of oblique holes almost through, are filled with active material and the lead hammered down over the holes to completely surround and inclose said active material in isolated pockets so formed. In this case, however, no hardened active material is used, and it is not exposed upon the surfaces of the plates when finished, and hence I do not claim any such construction in this application.

In carrying out my invention I first stamp or cut from a sheet of lead or other suitable ductile metal pieces of the general shape of the electrode or element to be formed. Each of these pieces is then placed in a press, and a large number of suitably-arranged holes are formed in it, either by forcing cutters through it or by punching out portions so as to form the requisite holes. In the holes of the lead plates so formed I place the previously-formed pieces or cylinders of the oxide of lead, or any other well-known active material, and then subject the lead bars between the pieces or cylinders of active material to pressure between suitable dies, which has the tendency of making the metal flow in the cold state and fit snugly around the lateral sides of the oxide-of-lead cylinders and hold them in position. It will be observed that in this method of making elements for secondary batteries I am enabled to dispense entirely with the use of heat, and hence the usual uncertainty in the casting process of obtaining good plates. In my construction I am absolutely sure of the results and have no waste or defective plates. It is purely a mechanical process of construction, and can be carried out without particular skill being required in the workman. In any process of construction requiring casting there is much trouble experienced from the uncertainty of the flow of the lead and the delay of handling the molds, which must be heated before the lead is poured in and cooled after the cast is made; and, further, unless everything is made to fit perfectly, there is considerable trouble from lead fins and flaws, and damaging action is liable to result to the oxide-of-lead cylinders if the heat is not properly controlled. In my construction all of these objections disappear. In place of subjecting the lead to pressure after the oxide of lead or active material has been placed within the openings, the plate may be completely formed by pressure and then the active material applied in the old way.

There are many modifications of my invention, which will appear evident after I have entered into the description of my improvements, and hence I do not limit myself to the specific details herein set out, and any matters which may be shown or described, but which are not claimed, are in no wise dedicated to the public, but will form the subject-matter of other applications.

Figure 2:
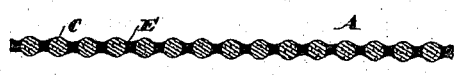
Figure 5:
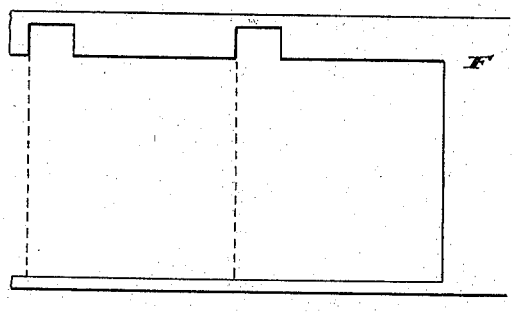
Figure 10:
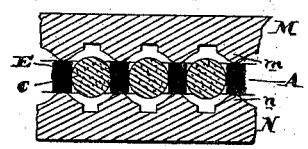
Figures 6, 7:
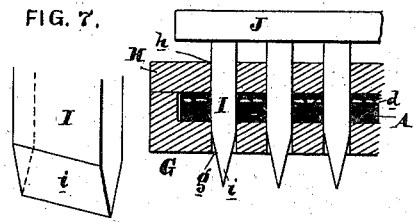
Figure 8:
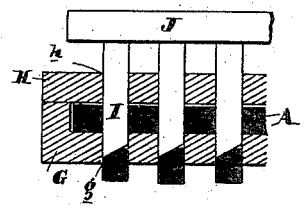
Figure 9:
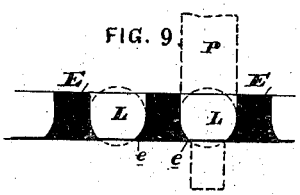
Figures 3, 4:
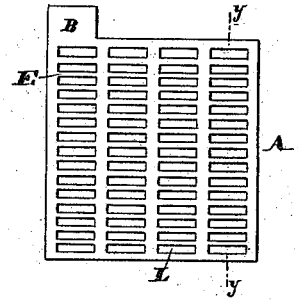
Figure 11:
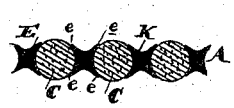

In the drawings, Figure 1 is a side elevation of an electrode or element for a secondary battery embodying my improvements. Fig. 2 is a cross-section of same on line *x x*. Fig. 3 is a side elevation of one of the metal plates stamped out of the lead sheet and into the form ready to receive the cylinders of active material. Fig. 4 is a vertical section of same on line $y\ y$. Fig. 5 is a diagram showing how the electrode-plates are cut out of a long sheet of lead. Fig. 6 is a cross-section of a portion of a hole-forming press in process of forming the electrode into the condition shown in Fig. 3. Fig. 7 is a perspective view of one form of perforating cutter or punch. Fig. 8 is a view similar to Fig. 6, showing another method of forming the holes in the electrode. Fig. 9 is a cross section of a portion of a modified electrode. Fig. 10 is a cross-section showing a portion of the filled electrode ready to be subjected to pressure to secure the active material in place, and Fig. 11 is a section of a portion of the electrode complete.

A represents the complete electrode or element, and has the ear B extending up to make connection with. It has the lead divisions D and E running at different angles, and so arranged as to hold the active material C between them.

In making my complete element I proceed as follows: From a sheet of lead I stamp out plates of the size required for the element, (see Fig. 5,) and this plate I then place in a die-plate holder, G H, having a series of apertures, $g\ h$, arranged close together. Above the die-plate holder I have a frame, J, from which depend cutters, perforators, or punches I, which pass into or through the holes $h$ and $g$ and perforate the lead plate as desired, bringing it to the shape shown in Fig. 3, with the numerous holes L. In Fig. 6 the punches or perforators are shown as knife-edged, $i$, (see Fig. 7,) which cut through the lead and force it back. In this case the lead plate, when inserted in the holder, would only reach the level $d$; but when spread out from either side of the cutter that part corresponding to the holes is caused to flow and fill up the spaces between the perforators. In the case of Fig. 8 ordinary punching methods are resorted to and the small pieces of the lead are punched out. A combination of these methods is used to make the shape of hole L shown in Fig. 9, in which the lower lips, $e$, are formed simultaneously with the punching of the hole. This would simply require the employment of a punch of the shape indicated in dotted lines at P. When the plate is so formed, the pieces, C, of oxide of lead or other suitable active material, previously formed and hardened, are passed into the apertures, as indicated in dotted lines, Fig. 9, and in full lines in Fig. 10. The plate so charged is then subjected to the pressure-dies, which form the lips $e\ e$, and thus hold the active material in place. When the holes are punched through, as indicated in Fig. 8 and also Fig. 4, the dies substantially like M and N of Fig. 10 are employed, the same having the spreading points or ridges $m\ n$ pressing in opposite directions, which has the effect of spreading the lead and forming the lips $e$, which lips lap over the lateral walls of the active-material cylinder or other shaped pieces, as shown in Fig. 11.

In the case of Fig. 9 the lips $e$ would simply have to be formed upon the upper side only, and hence the under die, N, would be made without the ridges or points $n$.

The particular shape of the pieces of active material and the perforations in the plate are immaterial to my invention, though practice has satisfied me that the best effects are obtained when they are made in the form of cylinders. The lead plate may be pure lead or a mixture of lead with antimony or bismuth or mercury, or combinations of any or all of these, and in place of lead any other suitable ductile metal may be used.

It will be observed that the lead plate is made thin between the pieces of active material, (see K, Fig. 11,) which makes the plate, if bent or warped from any cause, liable to bend at K instead of loosening the active-material cylinders. Any suitable machinery may be employed to produce the results here specified.

I am aware of English Patents 2,818 of 1882 and 5,183 of 1882, and do not claim anything therein set out or claimed.

Having now described my invention, what I claim as new, and desire to secure by Letters Patent, is—

1. The method of forming an element for a secondary battery, which consists in placing hardened pieces of active material in holes or perforations in a metal plate of ductile material and then bending the edges of said plate adjacent to the active-material pieces partly over them, to hold them in place and leave a large area of the active material exposed.

2. The method of forming an element for a secondary battery, consisting in making a metal plate of the proper shape and perforating it, then placing in said perforations or apertures pieces of active material in a hardened condition, and finally subjecting the metal of the plate between the active material to pressure, causing it to spread, so as to form lips which partly extend over the pieces of active material and hold them in place and expose said active material upon each surface of the plate.

3. The method of forming an element for a secondary battery, consisting in making a metal plate of the proper shape and perforating it with a series of parallel apertures, then placing in said perforations or apertures pieces of active material in a hardened condition and formed like small cylinders or bars of any cross-section, and finally subjecting the metal of the plate between the active material to pressure, causing it to spread, so as to form lips, which partly extend over the pieces of active material and hold them in place and expose said active material upon each surface of the plate.

4. The method of forming an element for a secondary battery, which consists in stamping from a sheet of lead a plate of the proper shape, then perforating it to form a large number of apertures, then placing hardened pieces of active material in said apertures, and finally subjecting the metal between the apertures to the action of spreading-dies, which spread the metal over the active material in the form of small lips to hold the active material in place.

5. The method of forming an element for a secondary battery, which consists in stamping from a sheet of lead a plate of the proper shape, then perforating it to form a large number of elongated apertures arranged in parallel rows, and each row formed of a series of such apertures arranged parallel to each other, then placing hardened elongated pieces of active material in said apertures, and finally subjecting the metal between the apertures to the action of spreading-dies, which spread the metal over the active material in the form of small lips to hold the active material in place.

6. The method of forming an element for a secondary battery, which consists in forming a lead plate with a series of apertures, then placing previously-hardened active-material pieces within said apertures, and finally subjecting the plate to the action of dies to force the lead to spread partly over the active-material pieces, to hold them in place and expose said active material upon each surface of the plate.

7. The method of forming an element for a secondary battery, which consists in forming a lead plate with a series of elongated parallel apertures, then placing previously-hardened active-material pieces of elongated shape within said apertures, and finally subjecting the plate to the action of dies to force the lead to spread partly over the active-material pieces, to hold them in place and expose said active material upon each surface of the plate.

8. The method of forming an element for a secondary battery, which consists in forming a lead plate with a series of elongated apertures, then placing previously-hardened active-material pieces of elongated shape within said apertures, and finally subjecting the plate to the action of dies to force the lead to spread partly over the active-material pieces, to hold them in place and reduce the thickness of the lead between the pieces of active material.

9. The method of making perforated plates for an element of a secondary battery, which consists in, first, perforating a plate of lead or other suitable metal or combination of metals of uniform thickness, and then subjecting it to pressure to reduce the thickness of the metal between the apertures and force the edges of the perforations to spread inwardly, to form overhanging lips without touching each other, and adapted to hold the active material in place.

10. The method of making an element for a secondary battery, which consists in perforating a plate of lead and subjecting it to the action of pressure at points or lines between the perforations, to cause the metal to flow inwardly toward the apertures, and filling such apertures with active material.

In testimony of which invention I hereunto set my hand.

RUDOLPH M. HUNTER.

Witnesses:
RICHD. S. CHILD, Jr.,
E. M. BRECKINREED.